US007593523B2

(12) United States Patent  (10) Patent No.: US 7,593,523 B2
Sterns  (45) Date of Patent: Sep. 22, 2009

(54) SYSTEM AND METHOD FOR PROVIDING INCOMING CALL DISTRIBUTION

(75) Inventor: Thomas Sterns, Pacific Grove, CA (US)

(73) Assignee: Language Line Services, Inc., Monterey, CA (US)

( * ) Notice: Subject to any disclaimer, the term of this patent is extended or adjusted under 35 U.S.C. 154(b) by 0 days.

(21) Appl. No.: 11/379,988

(22) Filed: Apr. 24, 2006

(65) Prior Publication Data

US 2007/0263810 A1  Nov. 15, 2007

(51) Int. Cl.
*H04M 3/00* (2006.01)
*H04M 5/00* (2006.01)
*H04L 12/66* (2006.01)

(52) U.S. Cl. .............................. 379/265.12; 379/265.01; 379/265.09; 379/266.01; 370/352; 370/356

(58) Field of Classification Search ............ 379/265.12, 379/265.01, 265.02, 265.09, 266.01; 704/3; 370/356, 352, 355
See application file for complete search history.

(56) References Cited

U.S. PATENT DOCUMENTS

| | | | |
|---|---|---|---|
| 4,445,211 A | 4/1984 | Webber | |
| 4,882,681 A | 11/1989 | Brotz | |
| 5,136,633 A | 8/1992 | Tejada et al. | |
| 5,353,335 A | 10/1994 | D'Urso et al. | |
| 5,375,164 A | 12/1994 | Jennings | |

(Continued)

FOREIGN PATENT DOCUMENTS

EP  0 601 710  6/1994

(Continued)

OTHER PUBLICATIONS

Carey Gillam, "Language Line Gives Guests A Chance To Reach Out Touch A Translator", The Kansas City Business Journal, Aug. 30, 1991, p. 2, vol. 9 No. 50.

(Continued)

*Primary Examiner*—Thjuan K Addy
(74) *Attorney, Agent, or Firm*—Patent Ingenuity, P.C.; Samuel K. Simpson (57) ABSTRACT

A method and system of routing incoming call is disclosed. An incoming call is received at a call center of a language interpretation provider. The incoming call is made by a customer requesting language interpretation service. The customer can be for example a business entity or an individual. A level of skill required by the customer is determined. The level of skill required represents a minimum skill set that an interpreter of the language interpretation provider should possess in order to provide the language interpretation service requested by the customer. The language interpretation service is provided during the incoming call. The incoming call can be queued at a first queue that distributes incoming calls to a call center interpreter. The call center interpreter is permanently connected to the call center of the language interpretation provider through a voice link. If a customer-defined event occurs, the incoming call is routed to a second queue that distributes incoming calls to a non-call center interpreter. The non-call center interpreter is not permanently connected to the call center of the language interpretation provider.

34 Claims, 7 Drawing Sheets

U.S. PATENT DOCUMENTS

| | | | |
|---|---|---|---|
| 5,392,343 A * | 2/1995 | Davitt et al. | 379/265.12 |
| 5,426,706 A | 6/1995 | Wood | |
| 5,509,060 A | 4/1996 | Hall et al. | |
| 5,544,229 A | 8/1996 | Creswell et al. | |
| 5,684,867 A | 11/1997 | Gesslein, Jr. et al. | |
| 5,749,075 A | 5/1998 | Toader et al. | |
| 5,794,218 A | 8/1998 | Jennings et al. | |
| 5,825,863 A | 10/1998 | Walker | |
| 5,875,422 A * | 2/1999 | Eslambolchi et al. | 704/3 |
| 5,884,246 A | 3/1999 | Boucher et al. | |
| 5,960,070 A | 9/1999 | O'Donovan | |
| 5,970,124 A | 10/1999 | Csaszar et al. | |
| 5,991,748 A | 11/1999 | Taskett | |
| 6,038,292 A | 3/2000 | Thomas | |
| 6,069,939 A | 5/2000 | Fung et al. | |
| 6,097,806 A | 8/2000 | Baker et al. | |
| 6,115,458 A | 9/2000 | Taskett | |
| 6,134,306 A | 10/2000 | Lautenschlager et al. | |
| 6,161,082 A | 12/2000 | Goldberg et al. | |
| 6,205,215 B1 | 3/2001 | Dombakly | |
| 6,208,851 B1 | 3/2001 | Hanson | |
| 6,227,972 B1 | 5/2001 | Walker et al. | |
| 6,229,879 B1 | 5/2001 | Walker et al. | |
| 6,246,755 B1 | 6/2001 | Walker et al. | |
| 6,263,058 B1 | 7/2001 | Lautenschlager et al. | |
| 6,289,088 B1 | 9/2001 | Bruno et al. | |
| 6,292,769 B1 | 9/2001 | Flanagan et al. | |
| 6,301,566 B1 | 10/2001 | Costello | |
| 6,337,903 B1 | 1/2002 | Manner | |
| 6,363,411 B1 | 3/2002 | Dugan et al. | |
| 6,381,316 B2 | 4/2002 | Joyce et al. | |
| 6,597,765 B1 | 7/2003 | Ksiazek | |
| 6,665,387 B2 | 12/2003 | Hannu | |
| 6,690,932 B1 | 2/2004 | Barner et al. | |
| 6,760,411 B2 | 7/2004 | Dybedokken et al. | |
| 6,801,602 B2 | 10/2004 | Glossbrenner | |
| 6,826,269 B2 | 11/2004 | Afana | |
| 6,856,674 B1 | 2/2005 | De Trana et al. | |
| 6,879,586 B2 * | 4/2005 | Miloslavsky et al. | 370/356 |
| 6,907,256 B2 | 6/2005 | Hokao | |
| 6,920,487 B2 | 7/2005 | Sofer et al. | |
| 6,963,557 B2 | 11/2005 | Knox | |
| 6,999,758 B2 | 2/2006 | Pence et al. | |
| 7,006,604 B2 | 2/2006 | Engelke | |
| 2001/0032878 A1 | 10/2001 | Tsiounis et al. | |
| 2001/0034599 A1 | 10/2001 | Kage et al. | |
| 2002/0046035 A1 | 4/2002 | Kitahara et al. | |
| 2002/0069048 A1 | 6/2002 | Sadhwani et al. | |
| 2002/0069067 A1 | 6/2002 | Klinefelter et al. | |
| 2002/0097854 A1 | 7/2002 | Bauer | |
| 2002/0152063 A1 | 10/2002 | Tokieda et al. | |
| 2002/0169592 A1 | 11/2002 | Aityan | |
| 2002/0181669 A1 | 12/2002 | Takatori et al. | |
| 2003/0008639 A1 | 1/2003 | Kanegae | |
| 2003/0095539 A1 | 5/2003 | Feuer | |
| 2003/0095542 A1 | 5/2003 | Chang | |
| 2003/0144912 A1 | 7/2003 | McGee | |
| 2003/0149557 A1 | 8/2003 | Cox et al. | |
| 2003/0154122 A1 | 8/2003 | Jackson, Jr. et al. | |
| 2003/0158722 A1 | 8/2003 | Lord | |
| 2003/0163300 A1 | 8/2003 | Kasvand et al. | |
| 2004/0014462 A1 | 1/2004 | Surette | |
| 2004/0092293 A1 | 5/2004 | Lee et al. | |
| 2004/0128139 A1 | 7/2004 | Ilan et al. | |
| 2004/0165579 A1 | 8/2004 | Mandle | |
| 2004/0267538 A1 | 12/2004 | Obuchi et al. | |
| 2005/0122959 A1 | 6/2005 | Ostrover et al. | |
| 2005/0129215 A1 | 6/2005 | Parker | |
| 2005/0149335 A1 | 7/2005 | Mesbah et al. | |
| 2005/0152530 A1 | 7/2005 | Pence et al. | |
| 2005/0209859 A1 | 9/2005 | Tenembaum et al. | |
| 2005/0216252 A1 | 9/2005 | Schoenbach et al. | |
| 2005/0261890 A1 | 11/2005 | Robinson | |
| 2005/0272414 A1 | 12/2005 | Vallarino | |
| 2006/0026001 A1 | 2/2006 | Bravin et al. | |
| 2006/0126821 A1 | 6/2006 | Sahashi | |
| 2006/0165225 A1 | 7/2006 | Sahashi | |
| 2007/0064915 A1 * | 3/2007 | Moore et al. | 379/265.12 |
| 2007/0064916 A1 * | 3/2007 | Moore et al. | 379/265.12 |
| 2007/0160188 A1 * | 7/2007 | Sharpe et al. | 379/265.01 |

FOREIGN PATENT DOCUMENTS

| | | |
|---|---|---|
| EP | 1041801 A3 | 11/2000 |
| EP | 1 545 110 | 6/2005 |
| EP | 1 545 111 | 6/2005 |
| JP | 2001 313721 | 11/2001 |
| JP | 2002 073783 | 3/2002 |
| JP | 2002 142024 | 5/2002 |
| JP | 2002-152387 | 5/2002 |
| JP | 2002 163400 | 6/2002 |
| JP | 2002 237897 | 8/2002 |
| JP | 2002 244842 | 8/2002 |
| JP | 2003 069720 | 3/2003 |
| JP | 2003 110702 | 4/2003 |
| JP | 2003-234833 | 8/2003 |
| JP | 2004 023262 | 1/2004 |
| JP | 2004-260430 | 9/2004 |
| JP | 2005-286979 | 10/2005 |
| RU | 2 143 135 C1 | 12/1999 |
| WO | WO 2004/030330 | 4/2004 |

OTHER PUBLICATIONS (Author not indicated), "The Phone Call That Speaks Your Language", Money magazine, Jun. 1991, p. 32, vol. 20 No. 6.

(Author not indicated), "News and Reports—AT&T Language Line", Managing Service Quality, 1995, vol. 5 No. 1, Submitted on Apr. 26, 2006.

(Author not indicated), "NHS Direct Translator—National Health Services", Chemist & Druggist magazine, Sep. 25, 2004.

Blayne Cutler, "Multilingual Marketers Work For The Police", American Demographics, Jan. 1992, p. 10, vol. 14 No. 1.

(Author not indicated), "Telephone Translators Covered In Deal Between SSH And California Company", Hospital Materials Management, Jun. 2002.

Frederick Gabriel, "Providers Say 'Ah', 'Ay' and 'Oy'—Health Care Providers Which Treat Non-English Patients Must Contend With Cultural And Linguistic Challenges", Crain's New York Business, Jan. 26, 1998, 14(4):30.

Brendan B. Read, "Gracias Por Llamar (Thank You For Calling)", Call Center Magazine, Oct. 2003, p. 32, vol. 16 No. 10.

Phil Zinkewicz, "In Any Other Language—Translators Handle Emergency Calls Or Business/Industry Needs", Insurance Advocate, Mar. 8, 2004, p. 2.

Language Lines Services, "Language Line Services Tutorial" Submitted on Apr. 24, 2006.

Language Line Services, "Commonly Asked Interpretation Questions And Answers", Jun. 22, 2004.

Language Line Services, "Over-The-Phone Language Interpretation . . . How Does That Work Exactly?", http://www.languageline.com/prod_serv_interp.php, 2 pages, Submitted on Apr. 24, 2006.

Tele-Interpreters, "Tele-Interpreters On-Call", http://web.archive.org/web/19990128224906/http://www.teleinterpreters.com/, 8 pages, Submitted on Apr. 24, 2006.

Tele-Interpreters, "Over-The-Phone Language Interpretation Services", http://www.teleinterpreters.com/otp_interpretation_services.aspx, 3 pages, Submitted on Apr. 24, 2006.

Network Omni, "On-Demand And Global OPI Services. 24/7/365 in 150 Languages", http://www.networkomni.com/opi-offering.asp, 2 pages, Submitted on Apr. 24, 2006.

Network Omni, "Translating On Demand In 140 Languages", http://web.archive.org/web/20000308070011/www.networkomni.com/TranslationLine.html, 2 pages, Submitted on Apr. 24, 2006.

* cited by examiner

SYSTEM AND METHOD FOR PROVIDING INCOMING CALL DISTRIBUTION

BACKGROUND

1. Field of the Technology

The present invention relates generally to call routing at a call center. More specifically, the present invention relates to routing incoming calls received at a call center based on the skill set required and other factors such as the volume and type of incoming calls, etc.

2. Description of the Background Art

Call centers that offer services over the telephone generally include multiple levels of skill to be used for customer calls. Generally, less skilled operators are the preferred operators to handle these calls. Specialized operators, on the other hand, are an asset, and only those calls requiring specialized skill level are to be routed to the corresponding highly skilled operators. In addition, factors such as connectivity of the operator, location of the operator, etc. can become contributing factors to better serve call center customers calls.

SUMMARY

In one aspect, there is a method of routing incoming call. An incoming call is received at a call center of a language interpretation provider. The incoming call is made by a customer requesting language interpretation service. The customer can be for example a business entity or an individual. A level of skill required by the customer is determined. The level of skill required represents a minimum skill set that an interpreter of the language interpretation provider should possess in order to provide the language interpretation service requested by the customer. The language interpretation service is provided during the incoming call. The incoming call can be queued at a first queue that distributes incoming calls to a call center interpreter. The call center interpreter is permanently connected to the call center of the language interpretation provider through a voice link. If a customer-defined event occurs, the incoming call is routed to a second queue that distributes incoming calls to a non-call center interpreter. The non-call center interpreter is not permanently connected to the call center of the language interpretation provider.

The customer-defined event can be defined by establishing a business rule that requires that all incoming calls be answered by an interpreter speaking an identified language. In another aspect, the customer-defined event is defined by establishing a business rule that requires that all incoming calls be answered by an interpreter within a pre-specified amount of time. In yet another aspect, the customer-defined event is defined by establishing a business rule that requires that all incoming calls be answered by an interpreter versed in health care terms. In yet another aspect, the customer-defined event is defined by establishing a business rule that requires that all incoming calls be answered by an interpreter versed in finance terms. In addition, the customer-defined event is defined by establishing a business rule that is stored in a customer database.

The level of skill required by the customer is determined by prompting the customer for input at a computer terminal, prompting the customer for voice input, or querying a customer database.

In another aspect of the method, call center interpreters can either be located in a physical building of the language interpretation provider, or in a remote location away from a physical building of the language interpretation provider. Furthermore, non-call center interpreters can either be located in a physical building of the language interpretation provider, or in a remote location away from a physical building of the language interpretation provider.

Furthermore, the customer can connect to the language interpretation provider through an Internet connection, or through a public switched network. The non-call center interpreter can receive the incoming call through a public switched network or an Internet connection. In addition, the call center interpreter can receive the incoming call through a public switched network or an Internet connection.

An incoming call can be charged according to call center interpreters or to non-call center interpreters. For instance, non-call center interpreter rates can be higher than call center interpreter rates.

In a further aspect, the request for language interpretation is received at a server communicably coupled with a computing device of the consumer. The computing device communicates with the server through a computer network.

In another aspect, there is a system for routing an incoming call. The system can comprise a private branch exchange, a skill determination module, and a routing module. The private branch exchange receives an incoming call at a call center of a language interpretation provider. The incoming call is made by a customer requesting language interpretation service. The skill determination module determines a level of skill required by the customer. The level of skill required represents a minimum skill set that an interpreter of the language interpretation provider should possess in order to provide the language interpretation service requested by the customer. The language interpretation service may be provided during the incoming call. In addition, the routing module routes the incoming call to a first queue that distributes incoming calls to a call center interpreter. The call center interpreter is permanently connected to the call center of the language interpretation provider through a voice link. The routing module can route the incoming call to a second queue that distributes incoming calls to a non-call center interpreter if a customer-defined event occurs. The non-call center interpreter is not permanently connected to the call center of the language interpretation provider.

In one aspect, there is another method of routing an incoming call. An incoming call is received at a call center of a service provider. The incoming call is generally made by a customer requesting a service. A level of skill required by the customer is determined. The level of skill required represents a minimum skill set that a representative of the service provider should possess in order to provide the service requested by the customer. The service can be provided during the incoming call. The call can then be queued at a first queue that distributes incoming calls to a call center agent. The call center agent is permanently connected to the call center of the service provider through a voice link. If a customer-defined event occurs, the incoming call is routed to a second queue that distributes incoming calls to a non-call center agent. The non-call center agent is not permanently connected to the call center of the service provider.

DRAWINGS

By way of example, reference will now be made to the accompanying drawings.

DETAILED DESCRIPTION

A method and system to provide routing and distribution of incoming calls are disclosed. Service providers often offer customer assistance through telephonic communication. Customers that call a service provider have different needs and requirements. Therefore, service providers must route calls depending on the skill level required to handle and service the calls efficiently. The system provided herein permits customer incoming calls to be efficiently routed to the appropriate agent for servicing the call. In addition, the system and method disclosed herein allows a service provider to route calls to a call center agent or to a non-call center agent. In one embodiment, call center agents are those that are on standby mode, ready to answer incoming calls. Such call center agents are permanently connected to the call center agent. The permanent connection of each call center agent to the call center represents a cost that the service provider must bear even when calls are not being serviced by the call center agent. Non-call center agents, on the other hand, are agents of the service provider who are only invoked on a per-call basis and, therefore, are not permanently connected to the call center. Because non-call center agents are not permanently connected to the call center, costs associated with a non-call center agent are limited only to the connection time of the calls being serviced by the non-call center agent. Non-call center agents can be more specialized and only invoked for servicing specific needs of a customer.

Accordingly, service providers can benefit from having a mix of call center agents and non-call center agents that are used. The system and method disclosed herein permit a service provider to distribute and route customer calls for the highest quality service by routing to both call center agents and non-call center agents. In addition, the system and method disclosed herein further permits customers at the outset to specify and customize the manner in which the calls are being distributed routed, and handled.

One example of a service provider is a reservation service provider, such as a travel agency or a car rental agency. Another example of a service provider is a financial services company. Yet another example of a service provider is a language interpretation provider. Quality, live, professional language interpretation, as disclosed herein, can turn a barely discernable communication into an instantaneously clearly understood conversation between people speaking different languages. Therefore, a customer that has specific language interpretation needs can be serviced by the correct interpreter when the customer call is appropriately distributed.

Figure 1A:
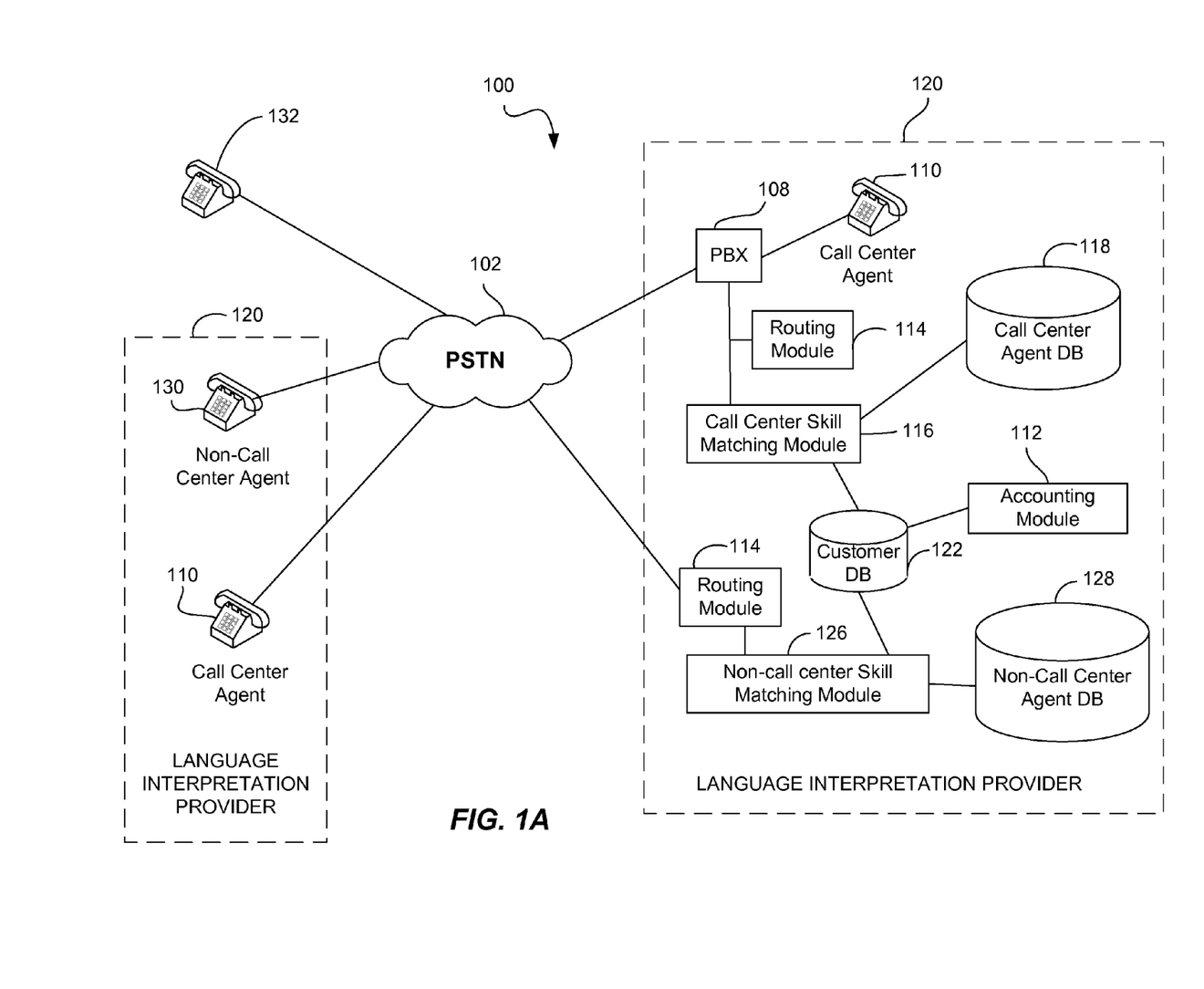
FIG. 1A illustrates a component diagram of a system for providing incoming call distribution.

FIG. 1A illustrates a component diagram of a system for providing incoming call distribution. A language interpretation provider 120 can include a communications infrastructure to handle incoming calls from customer 132. The language interpretation provider 120 can receive the calls from the customer 132 through a public switched telephone network 132. In another embodiment, the language interpretation provider 120 may include a hybrid infrastructure of call center agents 110 and non-call center agents 130. In one embodiment, call center agents can be interpreters who have a permanent active connection channel with the call center. For example, the call center agents 110 can be permanently connected to the private branch exchange 108. Thus, when a call is to be directed to a call center agent 110, the call center does not have to dial up a telephone number and establish a connection with the call center agent 110. Rather, the connection is pre-established and the call can simply be routed to the appropriate call center agent 110. The call center can include a call center agent database 118 which is a computer memory, or other form of data repository, that includes a collection of call center agent information. In one embodiment, the call center agent database 118 comprises call center agent records. Each record corresponding to a call center agent call consists of data as to status, whether the call center agent 110 is on a call, offline or on standby.

A call center skill-matching module 116 interacts with the call center agent database 118 to query and retrieve call center agents, e.g., interpreters that best match the business needs of the customer 132. Thus, the call center skill-matching module 116 can include logic to determine the skill required by the customer 132. In one embodiment, call center skill matching module 116 and the call center agent database 118 are part of an automatic call distributor (ACD), not illustrated.

The call center skill-matching module 116 can determine the skill required in different ways. In one embodiment, call center skill matching module 116 retrieves data associated with the customer 132 from the customer database 122 to find out the default skill required by the customer 132. Customer profiles stored in the customer database 122 may include data indicative of the type of service required for the customer 132. In one example, customer 132 is a financial institution. The profile of the financial institution can include one or more structures of skill required. For instance, a first level of skill can be interpretation for general information. In this case, an interpreter with general skills can be sufficient. The next two levels of skill can be for interpretation regarding personal accounts and business accounts. Here too, the interpreter required can be one with general knowledge. The next levels of skill can be for loan information, insurance accounts, franchise development, etc. At these levels, the interpreter required can be one with specific knowledge of a particular finance area. For instance, the interpreter can be prepared to translate terms and lexicography that is unique to insurance transactions, or real estate transactions, etc. In another example, the customer 132 may be an accounting firm requiring interpretation services. In another embodiment, the customer 132 may be a healthcare service provider that requires interpretations of a first language to a second language. For example, a hospital can be a customer 132, where the doctors in the hospital may want to communicate with doctors in a foreign hospital. The call center agent 110, i.e., the interpreter, engaged in the call must be prepared to translate medical terms. In this example, the profile of the hospital can include a skill level requirement that the interpreter be one prepared to correctly interpret medical terms. In another embodiment, customer 132 is a pharmaceutical company that requires a level of knowledge of pharmaceutical terms.

Therefore, a customer 132 can be a corporate entity or other business entity having a general profile. Callers calling the language interpretation provider 120 can be immediately associated with the customer 132 profile of the business entity and be provided with the interpretation skill level required. In addition, a caller, such as an employee of the business entity, can configure further specific preferences for translation. For example, an employee can configure the specific language spoken by the employee. Thus, anytime the employee calls the language interpretation provider 120, the employee can be connected with an interpreter having a skill set both as defined by the customer 132 (e.g., the company or business entity), as well as the skill set defined by the employee.

Further embodiments may be utilized to determine the skill set needed by the customer 132. In another embodiment, the call center skill-matching module 116 includes logic to inquire the calling customer 132 what skill level is required. For example, the different levels offered to a customer 132 can be provided as a selection of codes (e.g., {1, 2, 3, 4}). In another example, the level is based on the language spoken by the customer 132.

In another embodiment, the available skill levels can also be stored in the call center agent database 118. Each call center agent 110 can have associated skills that are searchable in order to match skills required by a calling customer 132.

The language interpretation provider 120 may route the call to the center agent 110 by performing a routing operation at the routing module 114. The routing module 114 can be configured with logic to route the call to a call center agent 110 identified by the call center skill matching module 116. In one embodiment, the routing of the call can be performed from the private branch exchange 108 directly to the call center agent 110 if the call center agent 110 has an open connection with the private branch exchange. In another embodiment, the routing of the call can be performed through the public switched network 102.

The customer database 122 can further include data related to services rendered to each customer 132. An accounting module 112 can be further configured to with logic to calculate correct billing charges to a user based on promotional discounts, preferred status, etc. In one embodiment, the accounting module 112 queries the customer database 122 in order to obtain customer 132 information regarding interpretation service usage, etc.

The language interpretation provider 120 can further include connectivity and call distribution to a non-call center agent 130. In one embodiment, the non-call center agent 130 is an interpreter who is not permanently connected to the call center or, in general, to infrastructure associated with the language interpretation provider 120. For example, the non-call center agent 130 can be an interpreter employed by the language interpretation provider 120. The non-call center agent 130 can be located in a remote site, such as a foreign jurisdiction, state, province or country.

The language interpretation provider 120 can further include a non-call center skill-matching module 126 as part of the call center infrastructure in order to query a non-call center agent database 128 for the most appropriate matching non-call center agent. Therefore, much like call center skill matching module 116, the non-call center skill matching module 126 is configured with logic both to establish the skill set level required by the customer 132 and to match the required skill set level with that of non-call center agents in the non-call center agents database 128.

In one embodiment, the non-call center skill matching module 126 prompts the customer 132 to input the skill set required. For example, the customer 132 may input data representing the interpretation language required, the type of business, and the knowledge, experience, etc., to the non-call center agent 130 for the service required. In another embodiment, the non-call center skill-matching module 126 determines the skill set level required from the customer database 122. As previously discussed, the customer database 122 includes customer 132 profiles representing default skills preferred by the customer 132, language required by the customer 132, etc. In yet another embodiment, the non-call center skill-matching module 126 determines the skill set required by obtaining information from respective relevant databases.

In addition, in one embodiment, once a skill set required is determined for a customer 132, the skill set preferred by that customer 132 can be recorded at the customer database 122. For example, once the call center skill-matching module 116 determines the skill set required by a new customer 132, the call center skill-matching module 116 can record such skill set at the customer database 122 in association with the telephone number or any other customer 132 identifier at the customer database 122. The non-call center skill-matching module and the non-call center agent database 128 can be part of an agent look-up (ALU) engine.

The routing module 114 is further configured with logic to route an incoming call to a non-call center agent. The determination of whether an incoming call received at the language interpretation provider 120 is routed to a call center agent 110 or to a non-call center agent 130 is based on one or more methodologies explained below.

Figure 1B:
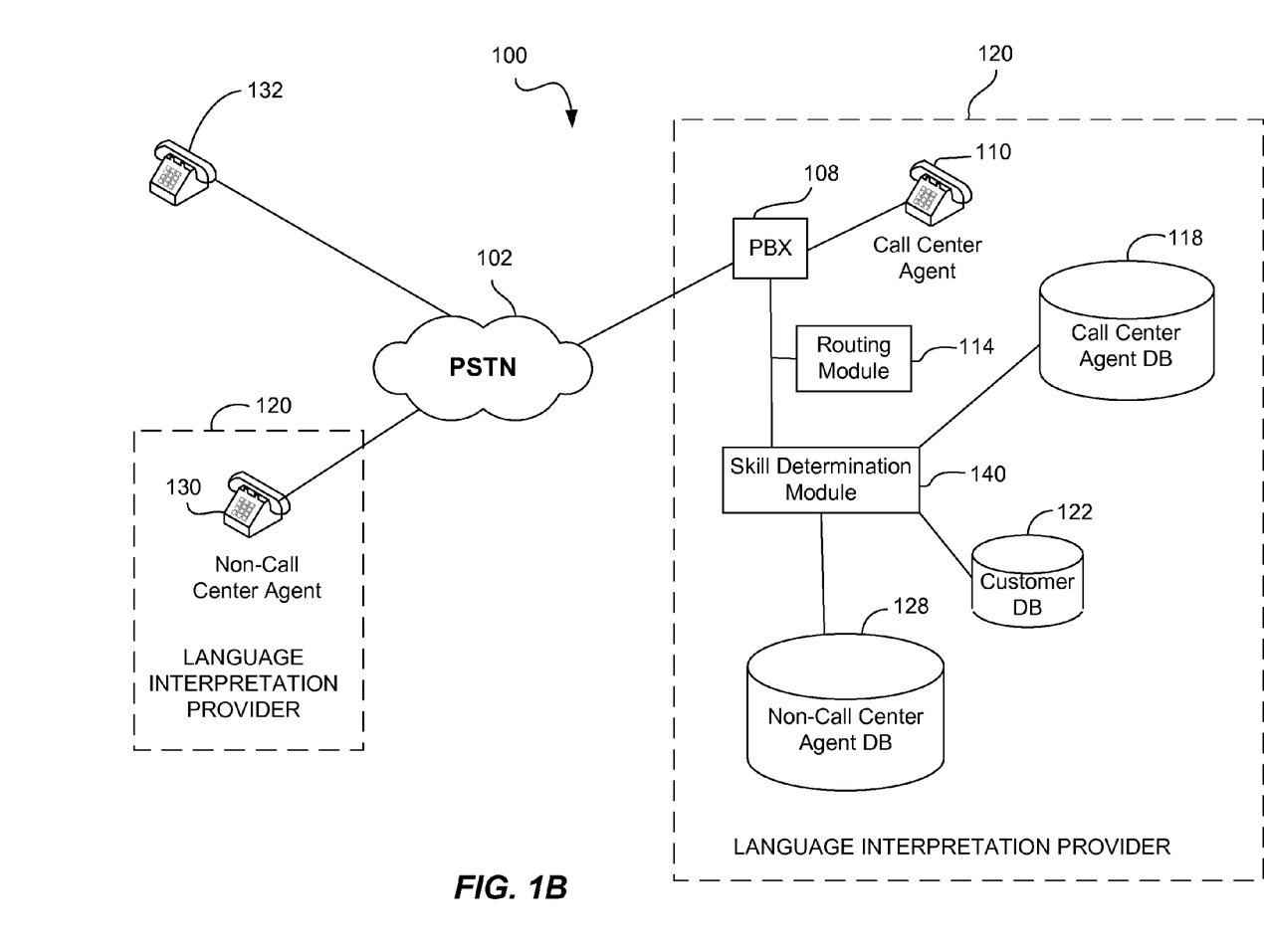
FIG. 1B illustrates a component diagram of a system for providing incoming call distribution.

FIG. 1B illustrates a component diagram of a system for providing incoming call distribution. In another embodiment, a skill determination module 140 determines the skill set required by a calling customer. In one embodiment, the skill determination module 140 prompts the customer 132 to input the skill set required. For example, the customer 132 may input data representing the interpretation language required, the type of business, and the knowledge, experience, etc., of the non-call center agent 130. In another embodiment, the skill determination module 140 determines the skill set level required from the customer database 122. Again, the customer database 122 includes customer profiles representing default skills preferred by the customer 132, language required by the customer 132, etc. In yet another embodiment, the skill determination module 140 determines the skill set required by obtaining information from the customer 132.

Figure 2:
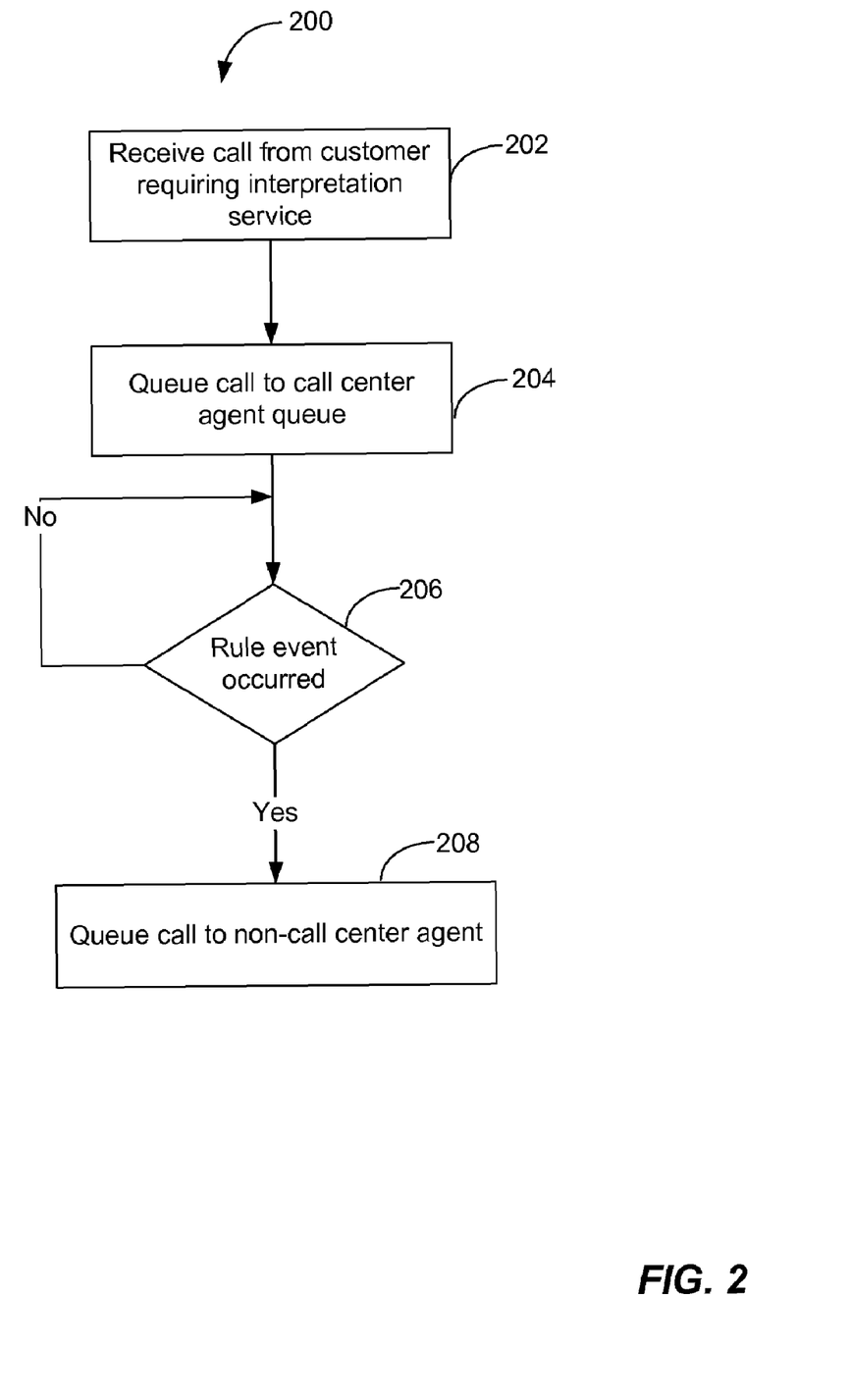
FIG. 2 illustrates a flow diagram for a process to route an incoming call to a non-call center agent.

FIG. 2 illustrates a flow diagram for a process 200 to route an incoming call to a non-call center agent. At process block 202, a call is received from a customer 132 requiring interpretation service. Process 200 continues to process block 204.

At process block 204, the incoming call is queued to a call center agent queue. Process 200 continues to decision block 206. At decision block 206, it is determined whether a rule event occurred. Event rules are events that are defined by one or more customer-defined rules; upon the event rules occurrence a specific action can be performed. In addition, an event rule can also be defined by the language interpretation provider 120. Event rules that are configured by customers of the language interpretation provider 120 are generally those establishing how a customer 132 call is to be routed, queued, and handled. In one example, an event rule can require that all calls received from a customer 132 be answered within fifteen seconds from receipt time. In another example, an event rule can require that all calls received from customer 132 be routed to an agent having a specific skill level, regardless of wait time. Yet another rule can require a specific skill set of the agent. The rule can further require that wait time must be no longer than forty five seconds. If forty-five seconds elapse, then the call can be routed to any interpretation service representative. Another event rule may require that only call center agents be utilized. In yet another embodiment, an event rule can be based on a specific load for a queue. As such, customer 132 can establish rules that best accommodate the customer 132 business needs, priorities, budget, etc.

Additionally, the event rules can be interpreted at the call center skill-matching module 116 and at the non-call center skill-matching module 126. In another embodiment, the event rules can be interpreted at the routing module 114. Thus, the routing module 114 can be further equipped or configured with logic to interpret rules configured by each customer 132.

In yet a third embodiment, the event rules may be interpreted at a rule interpretation module which is operably connected to the routing module 114 and the customer database 122. Event rules can be stored at the customer database 122 wherein customer 132's preferences are connected to rules on how to handle a call.

If a rule event occurred, then process 200 continues to process block 208. At process block 208, the call is queued to a non-call center agent queue. The routing module 114 can be further configured to request the non-call center skill-matching module 126 for a non-call center agent to connect the call. The request can be accompanied by a required skill set. Once a non-call center agent is identified, the routing module can dial, or otherwise connect through any voice link, to the non-call center agent 130.

Figure 3:
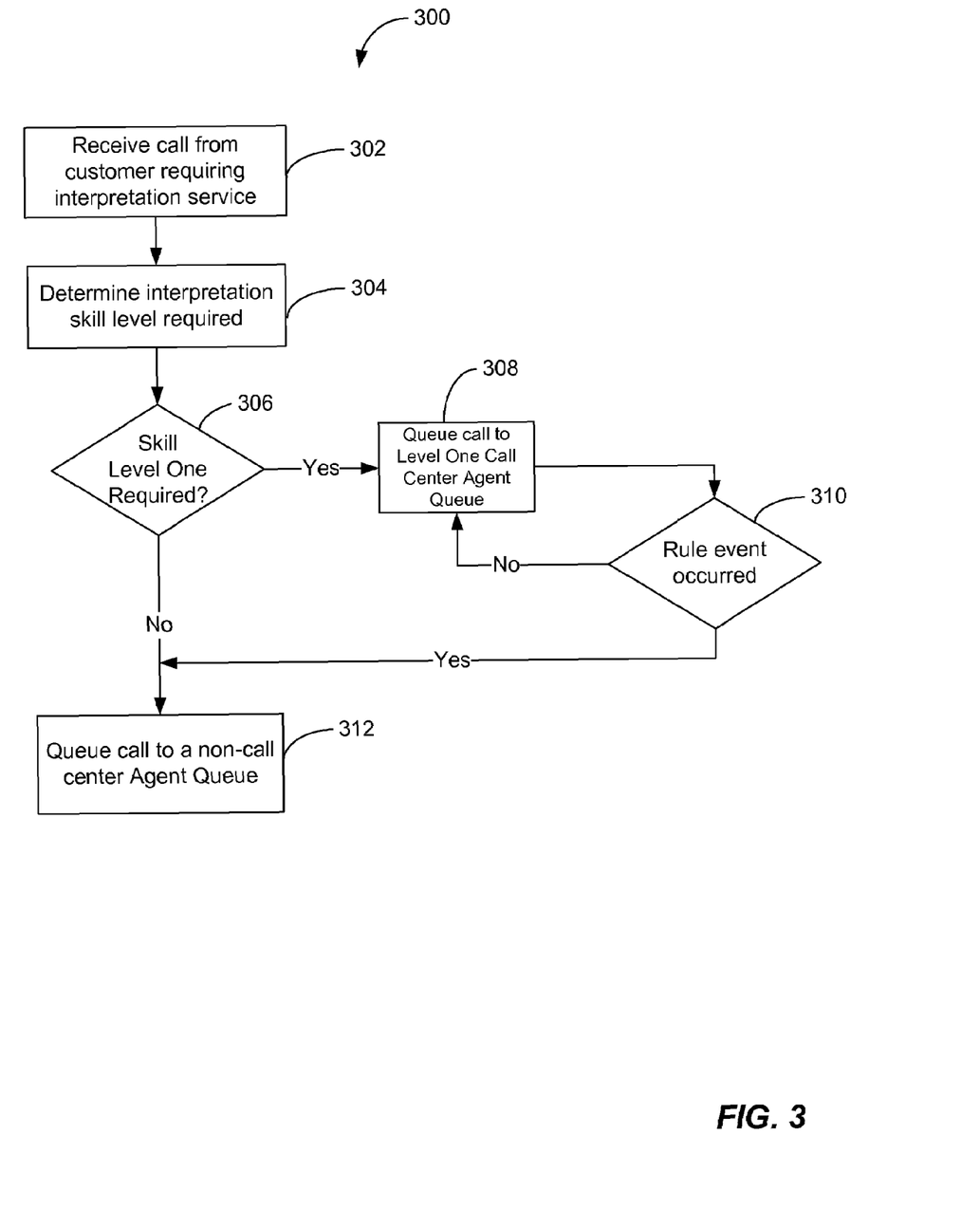
FIG. 3 illustrates a flow diagram for a process to route an incoming call to a non-call center agent.

FIG. 3 illustrates a flow diagram for a process 300 to route an incoming call to a non-call center agent. At process block 302, a call requiring language interpretation service is received at the language interpretation provider 120. Process 300 continues to process block 304. At process block 304, the skill level of interpretation required by the customer 132 is determined. As previously discussed, the skill level required by the call customer 132 can be determined utilizing various methodologies. In one example, the customer 132 is prompted to indicate the level of skill required. In another example, the default skill level required can be utilized. The default level can be stored in the profile of the customer 132 stored in the customer database 122. Process 300 continues to decision block 306.

At decision block 306, it is determined whether the skill level required is level one. In one embodiment, skill level one is indicative of the most basic level of skill, such as the skill necessary to answer the call and forward the call to the correct interpreter, or answer basic questions. In another embodiment, skill level one is indicative of the first level of skill within a specialized area. For example, skill level one can be the skill for interpretation of general financial terms. Skill level two can be the skill for interpretation of a specific of banking terms.

If it is determined that the skill level required is level one, process 300 continues to process block 308. On the other hand, if it is determined that the skill level required is not level one, process 300 continues to process block 312.

At process block 308, the incoming call is queued for a level-one call center agent. Process 300 continues to decision block 310. At decision block 310, it is determined whether a rule event has occurred. As discussed above, a rule event can occur when an event connected to a rule established by the language service provider 120 occurs. Furthermore, a rule event occurs when an event defined by a predetermined business rule established by a customer 132 occurs. In one example, the business rule established by the customer 132 can be that a call must be answered by an agent within thirty seconds from the receipt of the call by the language service provider 120. In that case, the routing module 114 can reroute the call to a higher skill agent. The customer's choice to have interpretation agents servicing the call within a short period of time may represent higher costs for the customer 132 because non-call center agents, which may be highly qualified and expensive, are engaged to service the call. In contrast, a customer 132 may choose to always wait for a level one agent, which may be less expensive, thereby saving costs. The rules established by customers that are companies and large entities can be applied to any employee of such customer 132. For example, if the customer 132 is a bank that serves clients in different countries, the customer bank may decide to always utilize first a level one agent. Any bank employee call the language interpretation provider 120 for interpretation service, would be serviced first by a level one agent. Additionally, the customer 132 can customize employee accounts such that the employee preferences can override the initial default preferences by the bank.

If it is determined that a rule event has occurred, then process 300 continues to process block 312. If it is determined that a rule event has not occurred, then process 300 continues to process block 308 as discussed previously.

At process block 312, the incoming call is queued to a non-call center agent. In one embodiment, the call queued to the non-call center agent is a level one. In one example, the non-call center agent is skilled only on level one, then the non-call center agent serves as a backup of call overflow. In another example, the non-call center agent is skilled to service and handle level-one calls and level-two calls. In that case, the call-center agent services the call based on the needs of the customer 132.

The method and system disclosed herein can be utilized to escalate calls from a call center queue to a non-call center queue. Escalation can generally occur when a call queued at a given skill level is then requeued to a queue to an agent of higher skill. For example, an incoming call that is originally queued for an agent that services general information can then be escalated to an interpreter with knowledge of scientific terms. Thus, for example, an original level-one call that is requeued for a level two non-call center agent is escalated.

In another embodiment, the skill level of the call routed to the non-call center agent is unknown. The non-call center agent can be trained to handle multiple levels of calls, thus, a call for skills to be determined may be handled by the non-call center agent. As such, in one example, the non-call center agent can be trained to handle calls of skill level one, two and three. In another example, the non-call center agent can be trained to handle calls of skill level one, two, three and four.

Figure 4:
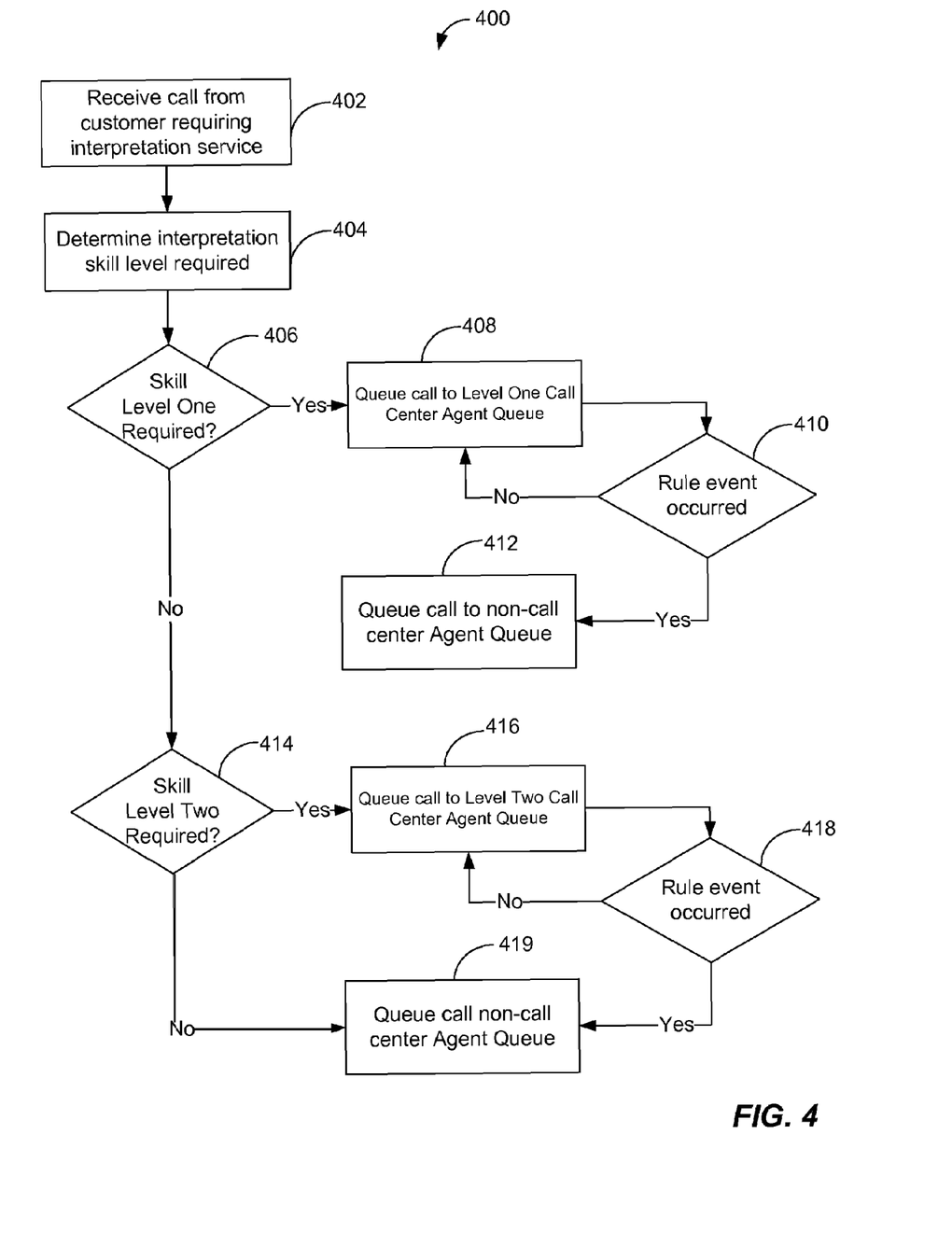
FIG. 4 illustrates a flow diagram for a process to escalate backup calls from a call center to a non-call center.

FIG. 4 illustrates a flow diagram for a process to escalate backup calls from a call center to a non-call center. At process block 402, a call for language interpretation service is received from a customer 132. The process 400 continues to process block 404. At process block 404, the skill level of service required is determined. The skill level can be the interpretation skill level, the number of languages the interpreter knows, etc. The process 400 continues to decision block 406.

At decision block 406, it is determined whether the skill level required is skill level one. If it is determined that the skill level required is skill level one, then process 400 continues at process block 408. If it is determined that the skill level required is not skill level one, then process 400 continues at decision block 414. Again, the skill level required by the call customer 132 can be obtained using one or more methodologies previously discussed.

At process block 408, the call is queued to a level-one call center queue. The process 400 continues to decision block 410. At decision block 410, it is determined whether a rule event has occurred. If it is determined that a rule event has occurred, then process 400 continues to process block 412. If it is determined that a rule event has not occurred, then process 400 continues to process block 408, and the process 400 continues as described above regarding process block 408. However, if the call center agent starts servicing the call, then the call can be dequeued.

At process block 412, the call is queued to a non-call center queue. In one embodiment, all non-call center agents are trained to service all levels of skill. Therefore, the call can be routed to any non-call center agent. In another embodiment, only some non-call center agents are trained to service level-one calls. Therefore, the call is queued for a non-call center agent trained to service level-one calls.

At decision block 414, it is determined whether the skill level required is skill level two. If it is determined that the skill level required is skill level two, then the process 400 continues to process block 416. If it is determined that the skill level required is not skill level two, then the process 400 continues to process block 419. Again, the skill level required by the call customer 132 can be obtained using one or more methodologies previously discussed.

At process block 416, the call is queued to a level-two call center queue. The process 400 continues to decision block 418. At decision block 418, it is determined whether a rule event has occurred. If it is determined that a rule event has occurred, then process 400 continues to process block 419. If it is determined that a rule event has not occurred, then process 400 continues to process block 416, and the process 400 continues as described above regarding process block 408. However, if the call center agent starts servicing the call, then the call can be dequeued.

At process block 419, the call is queued to a non-call center queue. In one embodiment, all non-call center agents are trained to service all levels of skill. Therefore, the level-two call can be routed to any non-call center agent. In another embodiment, only some non-call center agents are trained to service level-two calls. Therefore, the call is queued for a non-call center agent trained to service level-two calls.

Figure 5:
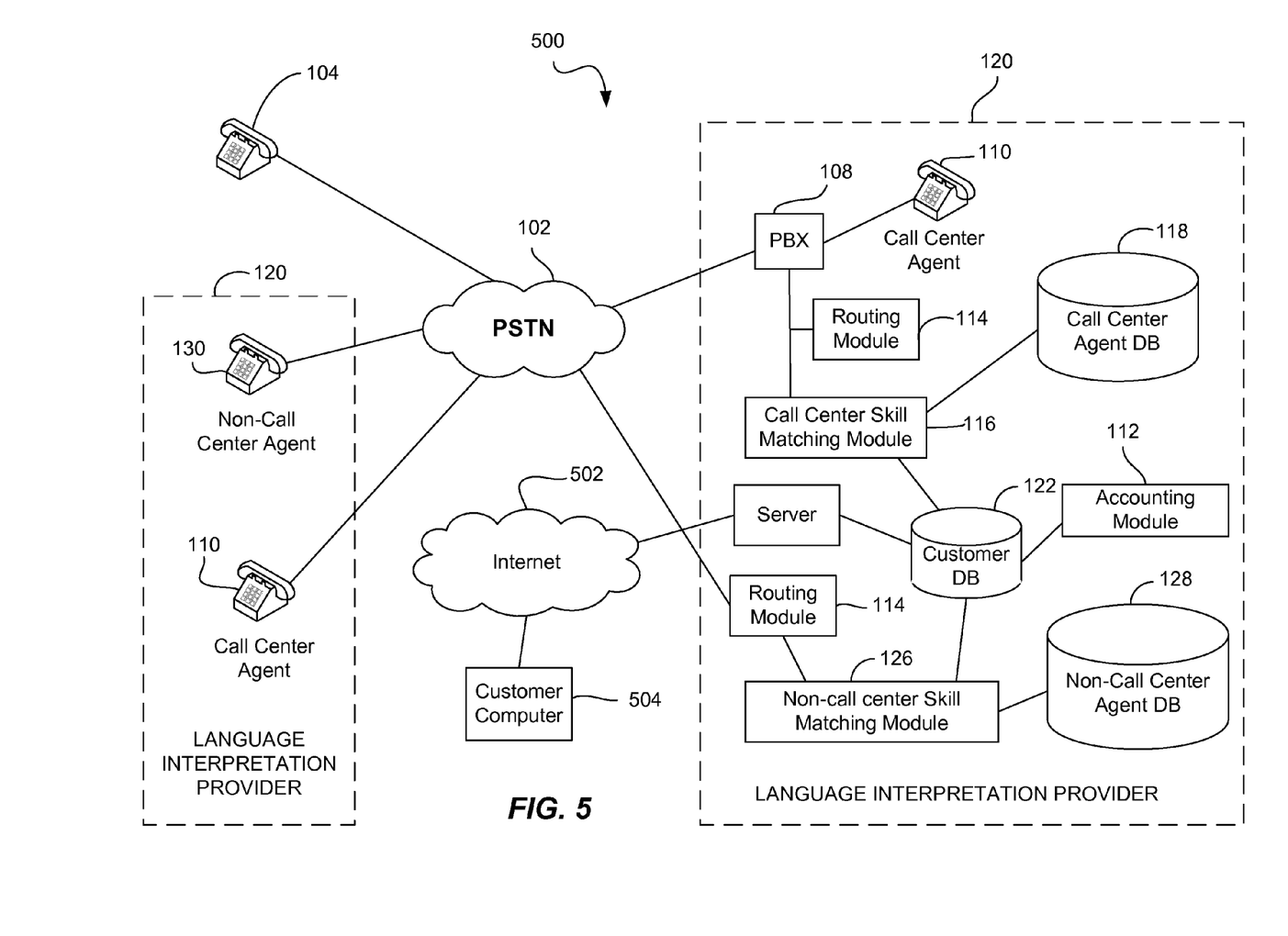
FIG. 5 illustrates a component diagram of a system to provide incoming call distribution wherein the customer is able to configure call-handling preferences.

FIG. 5 illustrates a component diagram of a system for providing incoming call distribution wherein the customer 132 is able to configure call-handling preferences. In one embodiment, the customer 132 can configure the customer profile to include user preferences in handling the calls.

In one embodiment, business rules are communicated through a customer computer 504, and transmitted over the Internet 502 to a server 506. The server 506 can include a Web server, or any other computer process configured to receive configuration data from one or more customer computers. In one example, customer computer 504 can be configured with a Web client that can permit a customer to enter data on a Web form. In another example, customer computer 504 can be configured with a computer application in which customer configurations can be entered. In yet another embodiment, business rules are simply communicated orally to an agent of the language interpretation provider 120, who then enters the customer preferences at server 506.

The user preferences configured by the customer 132 can include business rules on call routing handling. Many examples exist as to the variations of business rules that a customer can configure. In one example, the business rules relate to the level of skill required by all incoming calls from a customer. In another example, a business rule relates to the length of customer wait time from the time at which a language interpretation provider is connected to the customer until an interpreter is engaged in the call. In another example, a business rule relates to the length of customer wait time during a transfer from a first agent to a second agent. In another example, a business rule relates to the default language of translation. In another example, a business rule relates to the maximum per minute rate that the customer is willing to pay.

Rules received by the language interpretation provider 120 can be stored in one or more storage modules. In one example, the business rules associated with the customer 104 can be stored at the customer database 122, in association with a customer identifier. The customer identifier can be a unique alphanumeric identifier, e.g., a telephone number. In another example, the business rules associated with the customer 104 can be stored at any other storage module accessible to the non-call center skill-matching module 122, the call center skill-matching module 122, and to the routing module 114.

Figure 6:
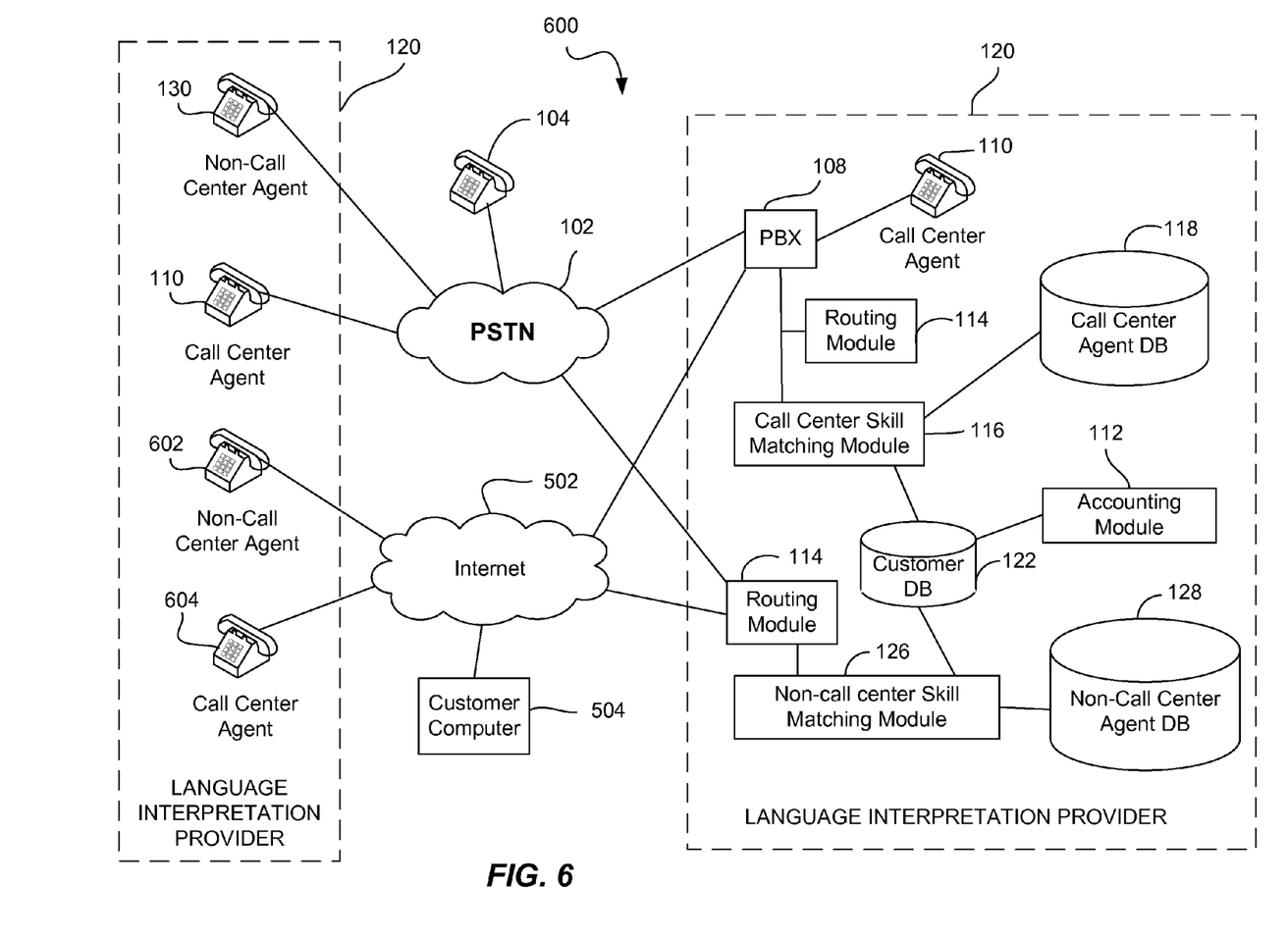
FIG. 6 illustrates a component diagram of a system to provide call distribution through various communication networks.

FIG. 6 illustrates a component diagram of a system 600 for providing call distribution through various communication networks. The system 600 illustrates some of the same components as illustrated in FIG. 1. In addition, the system 600 includes a call center agent 604 and a non-call center agent 602 that communicate with the language interpretation provider 120 through a data network, such as Internet 502. Thus, data transfer through the Internet 502 can be performed through a voice-over-IP protocol, or any other packet-switched voice protocol.

Furthermore, the customer can also communicate through a packet-switched network, such as the Internet. For example, the customer can utilize customer computer 504 to transmit voice data over the Internet which can be received at the private branch exchange 212 or at the routing module 112.

While the apparatus and method have been described in terms of what are presently considered to be the most practical and preferred embodiments, it is understood that the disclosure need not be limited to the disclosed embodiments. It is intended to cover various modifications and similar arrangements included within the spirit and scope of the claims, the scope of which should be accorded the broadest possible interpretation so as to encompass all such modifications and similar structures. It should further be clear that system modules such as the routing module, the call center skill-matching module, the skill-matching module, and the non-call center skill matching modules could be implemented in various manners. For example, a computer server programmed with logic to operated utilizing a microprocessor can be utilized. The present disclosure includes any and all embodiments of the following claims.

The invention claimed is:

1. A method of routing an incoming call, comprising:
   establishing a first business skill level in a language and a second business skill level in the language such that the second business skill level has a higher degree of skill in a business service in the language than the first business skill level;
   associating a first language interpreter having the first business skill level in the language with the first business skill level;
   associating a second language interpreter having the second business skill level in the language with the second business skill level;
   receiving an incoming call at a call center of a language interpretation provider, wherein the incoming call is made by a customer requesting language interpretation service for the business service in the language;
   determining which of the first business skill level or the second business skill level at a minimum provides the business service to the customer;
   selecting the first language interpreter to facilitate providing of the business service to the customer through language interpretation during the incoming call if the first business skill level is determined to provide, at a minimum, the business service to the customer;
   selecting the second language interpreter to facilitate providing of the business service to the customer through language interpretation during the incoming call if the second business skill level is determined, at a minimum, to provide the business service to the customer;

queuing the incoming call at a first queue that distributes incoming calls to a call center interpreter, wherein the call center interpreter is permanently connected to the call center of the language interpretation provider through a voice link, wherein the call center interpreter is the first language interpreter or the second language interpreter based on the selection; and if a customer-defined event occurs, routing the incoming call to a second queue that distributes incoming calls to a non-call center interpreter, wherein the non-call center interpreter is not permanently connected to the call center of the language interpretation provider.

2. The method of claim 1, wherein the customer-defined event is defined by establishing a business rule that requires that incoming calls be answered by an interpreter speaking an identified language.

3. The method of claim 1, wherein the customer-defined event is defined by establishing a business rule that requires that incoming calls be answered by an interpreter within a pre-specified amount of time.

4. The method of claim 1, wherein the customer-defined event is defined by establishing a business rule that requires that incoming calls be answered by an interpreter versed in health care terms.

5. The method of claim 1, wherein the customer-defined event is defined by establishing a business rule that requires that incoming calls be answered by an interpreter versed in finance terms.

6. The method of claim 1, wherein the customer-defined event is defined by establishing a business rule that is stored in a customer database.

7. The method of claim 1, wherein the business service that is to be provided to the customer is determined by prompting the customer for input at a computer terminal.

8. The method of claim 1, wherein the business service that is to be provided to the customer is determined by prompting the customer for voice input.

9. The method of claim 1, wherein the business service that is to be provided to the customer is determined by querying a customer database.

10. The method of claim 1, wherein the customer is a business entity.

11. The method of claim 1, wherein the customer connects to the language interpretation provider through an Internet connection, or through a public switched network.

12. The method of claim 1, wherein the non-call center interpreter receives the incoming call through a public switched network or an Internet connection.

13. The method of claim 1, wherein the call center interpreter receives the incoming call through a public switched network or an Internet connection.

14. The method of claim 1, wherein an incoming call is charged according to call center interpreters or to non-call center interpreters.

15. The method of claim 14, wherein non-call center interpreter rates are higher than call center interpreter rates.

16. The method of claim 14, wherein the request for language interpretation is received at a server communicably coupled with a computing device of the consumer, wherein the computing device communicates with the server through a computer network.

17. A system for routing an incoming call, comprising:
a private branch exchange that receives an incoming call at a call center of a language interpretation provider, wherein the incoming call is made by a customer requesting language interpretation service for a business service in a language;

an establishment module that establishes a first business skill level in a language and a second business skill level in the language such that the second business skill level has a higher degree of skill in a business service in the language than the first business skill level;

an association module that associates a first language interpreter having the first business skill level in the language with the first business skill level and a second language interpreter having the second business skill level in the language with the second business skill level;

a determination module that determines which of the first business skill level or the second business skill level at a minimum provides the business service to the customer;

a first language interpreter selection module that selects the first language interpreter to facilitate providing of the business service to the customer through language interpretation during the incoming call if the first business skill level is determined, at a minimum, to provide the business service to the customer;

a second language interpreter selection module that selects the second language interpreter to facilitate providing of the business service to the customer through language interpretation during the incoming call if the second business skill level is determined, at a minimum, to provide the business service to the customer; and a routing module that routes the incoming call to a first queue that distributes incoming calls to a call center interpreter, wherein the call center interpreter is permanently connected to the call center of the language interpretation provider through a voice link, wherein the call center interpreter is the first language interpreter or the second language interpreter based on the selection, the routing module further routing the incoming call to a second queue that distributes incoming calls to a non-call center interpreter if a customer-defined event occurs, wherein the non-call center interpreter is not permanently connected to the call center of the language interpretation provider.

18. The system of claim 17, further comprising a non-call center skill-matching module that identifies the non-call center interpreter.

19. The system of claim 17, further comprising a call center skill-matching module that identifies the call center interpreter.

20. The system of claim 17, wherein the customer-defined event is defined by establishing a business rule that requires that incoming calls be answered by an interpreter speaking an identified language.

21. The system of claim 17, wherein the customer-defined event is defined by establishing a business rule that requires that incoming calls be answered by an interpreter within a pre-specified amount of time.

22. The system of claim 17, wherein the customer-defined event is defined by establishing a business rule that requires that incoming calls be answered by an interpreter versed in health care terms.

23. The system of claim 17, wherein the customer-defined event is defined by establishing a business rule that requires that incoming calls be answered by an interpreter versed in finance terms.

24. The system of claim 17, wherein the customer-defined event is defined by establishing a business rule that is stored in a customer database.

25. The system of claim 17, wherein the business service that is to be provided to the customer is determined by prompting the customer for input at a computer terminal.

26. The system of claim 17, wherein the business service that is to be provided to the customer is determined by prompting the customer for voice input.

27. The system of claim 17, wherein the business service that is to be provided to the customer is determined by prompting the customer for voice input.

28. The system of claim 17, wherein the customer is a business entity.

29. The system of claim 17, wherein the customer connects to the language interpretation provider through an Internet connection, or through a public switched network.

30. The system of claim 17, wherein the non-call center interpreter receives the incoming call through a public switched network or an Internet connection.

31. The system of claim 17, wherein the call center interpreter receives the incoming call through a public switched network or an Internet connection.

32. The system of claim 17, wherein an incoming call is charged according to call center interpreters or to non-call center interpreters.

33. The system of claim 32, wherein non-call center interpreter rates are higher than call center interpreter rates.

34. The system of claim 32, wherein the request for language interpretation is received at a server communicably coupled with a computing device of the consumer, wherein the computing device communicates with the server through a computer network.

* * * * *